United States Patent [19]

Ljung

[11] 4,257,015
[45] Mar. 17, 1981

[54] RING LASER GYROSCOPE ANODE

[75] Inventor: Bo H. G. Ljung, Wayne, N.J.

[73] Assignee: The Singer Company, Little Falls, N.J.

[21] Appl. No.: 23,980

[22] Filed: Mar. 26, 1979

[51] Int. Cl.$^3$ .............................................. H01S 3/083
[52] U.S. Cl. ........................ 331/94.5 D; 331/94.5 C; 356/350
[58] Field of Search ................... 331/94.5 G, 94.5 D, 331/94.5 PE, 94.5 C; 356/350; 313/210, 214

[56] References Cited

U.S. PATENT DOCUMENTS

| 1,634,201 | 6/1927 | Massolle et al. ................. 313/210 |
| 3,467,472 | 12/1966 | Killpatrick ....................... 331/94.5 C |

*Primary Examiner*—William L. Sikes
*Assistant Examiner*—Léon Scott, Jr.
*Attorney, Agent, or Firm*—James C. Kesterson; Thomas W. Kennedy

[57] ABSTRACT

An anode for a ring laser gyroscope which provides improved current stability in the glow discharge path is disclosed. The anode of this invention permits operation at lower currents thereby allowing a reduction of heat dissipation in the ring laser gyroscope. The anode of one embodiment of this invention is characterized by a thumbtack appearance with a spherical end where the normal sharp end of the thumbtack would be located. The stem of the anode extends from the outside of the gyroscope structure to the interior of the structure such that the spherical end is substantially adjacent to the laser beam.

8 Claims, 6 Drawing Figures

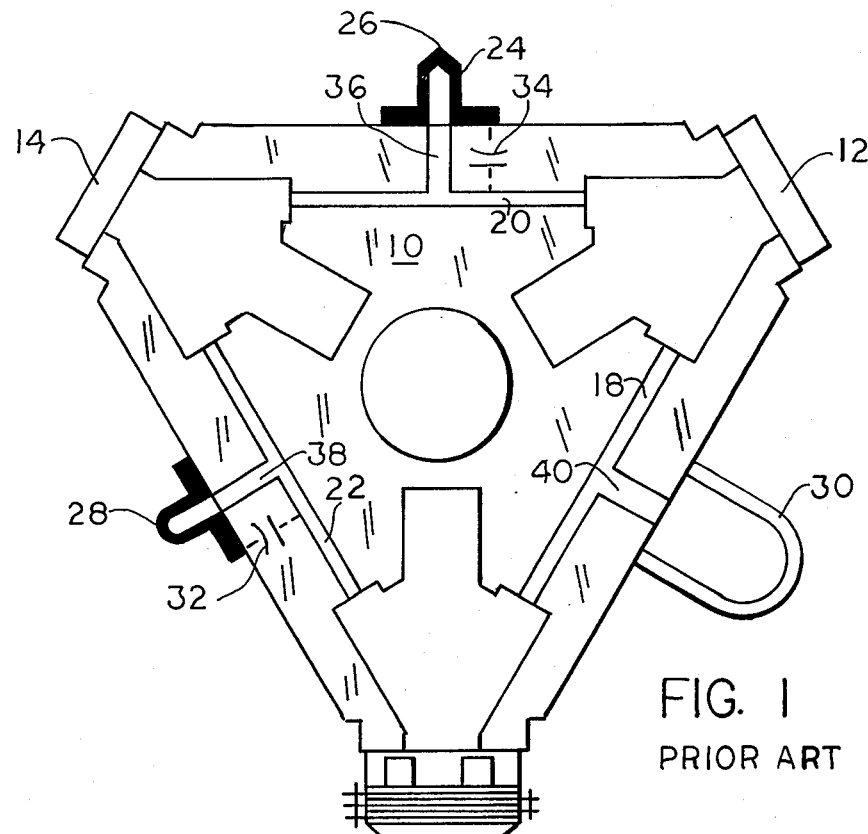
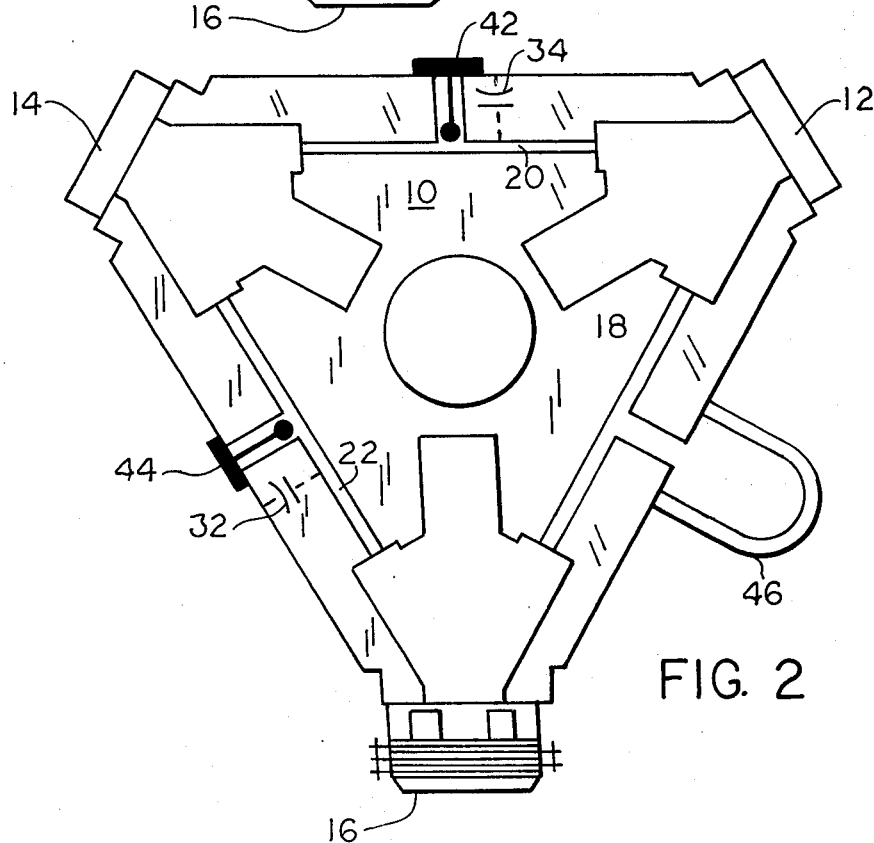
FIG. 1 PRIOR ART
FIG. 2

RING LASER GYROSCOPE ANODE

BACKGROUND OF THE INVENTION

This invention relates to ring laser gyroscope in general and more particularly to a novel anode that permits operation at substantially lower currents, which in turn allows operation of the ring laser gyroscope with a considerable reduction in the heat dissipation.

As is inherent in its name, the ring laser gyroscope uses a laser beam which travels in a closed path. Regardless of whether the closed path is triangular, rectangular, pentagonal, etc., the closed path is commonly referred to as a ring. Such a ring laser gyroscope is used to detect rotation about the axis of the path around which the laser beam travels. Typical ring laser gyroscopes are disclosed in U.S. Pat. Nos. 3,373,650 and 3,467,472. According to the ring laser gyroscopes described in these patents, there is included a triangular block which forms a triangular-shaped ring laser cavity defined by mirrors at the three corners.

As is understood by those skilled in the art, and as will be further discussed with respect to prior art FIG. 1 hereinafter, a ring laser gyroscope is typically made of a glass ceramic material which forms an optical cavity. The selected lasing gas is used to fill this optical cavity. Mirrors are positioned around the optical cavity at appropriate locations such that the laser beam is reflected in a triangular shape through the optical cavity. A glow discharge is created in the gas filled optical cavity by means of anodes and cathodes which are in communication with the gas filled optical cavity. In the prior art ring laser gyroscopes, the paths by which the anodes and cathodes communicated with the gas filled optical cavity were capillaries leading to that portion of the gyroscope at which anodes and cathodes were mounted. Thus, because of the very high dielectric index usually associated with the ceramic material from which the cavity was made, stray capacitance existed between the anodes and the glow discharge in the capillaries. Furthermore, stray capacitance also existed between the anodes and surrounding areas and portions of the gyroscope and mounting structures. This stray capacitance between the anode and other structures is believed to be the chief reason for current instabilities in the glow discharge. Therefore, it is an object of this invention to provide a ring laser gyroscope which reduces the stray capacitance between the anodes and other structures as well as between the anode and the capillary path containing the glow discharge.

In addition, presently available ring laser gyroscopes necessarily must use a low gas pressure in the gas filled cavity which results in considerable sputtering of the cathode. Even a small increase of the gas pressure in the ring laser gyroscope would result in a substantial reduction in the sputtering of the cathode. Therefore, it is another object of this invention to provide a ring laser gyroscope which operates at a higher gas pressure without simultaneously having a plasma oscillation condition.

It is also understood by those skilled in the art that if a lower anode current can be used without a drop out of the glow discharge, there will be a considerable reduction of power consumption and consequently heat dissipation in the gyroscope due to the lower currents. Therefore, it is still another object of this invention to provide a ring laser gyroscope having reduced power consumption and heat dissipation.

Since temperature variations or gradients in the plane of the triangular structure of the ring laser gyroscope, causes gas currents to flow, it is not unusual that a false input rate may be indicated because of such gas currents. Thus, since increasing the fill pressure of the gas cavity reduces the sensitivity to temperature variation, it will be appreciated that a reduction in power consumption and consequently in heat dissipation will increase the stability of the ring laser gyroscope itself. Thus, it is another object of this invention to increase the stability of a ring laser gyroscope.

SUMMARY OF THE INVENTION

To accomplish the above mentioned objects, as well as other objects which will become evident from the following drawings and detailed description, the present invention provides a new anode which includes a shaft portion extending from the exterior of the ring laser gyroscope structure material substantially adjacent to the laser beam. An exterior portion seals the cavity and allows electrical connection therewith. According to one embodiment, the shaft includes a spherical portion at the end, adjacent to the laser beam which prevents the glow discharge from occuring along the shaft portions of the anode. In a preferred embodiment the material of the anodes is a titanium alloy. A thin stem or shaft of the anode extends between the exterior portion and the spherical portion. This thin stem minimizes stray capacitance and results in an anode resistant to sputtering.

Accordingly, the above mentioned objects and subsequent description will be more readily understood by reference to the following drawings wherein:

BRIEF DESCRIPTION OF THE DRAWINGS

FIG. 1 is a pictorial diagram representative of a prior art gas filled gas laser gyroscope showing the prior art anodes and a cathode.

FIG. 2 is a pictorial diagram of a gas filled ring laser gyroscope using an anode incorporating the features of this invention.

DESCRIPTION OF THE INVENTION

Figure 3:
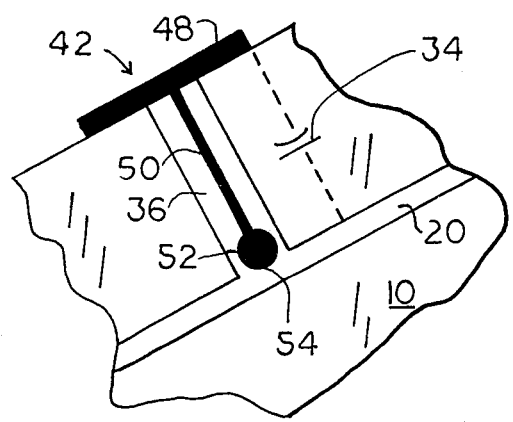
FIGS. 3, 4, 5 and 6 represent cut-away portions of FIG. 2 showing still other embodiments of the anode of this invention.

Referring now to FIG. 1 there is disclosed a pictorial representation of a gas filled ring laser gyroscope incorporating prior art anodes. The gyroscope includes a body portion 10 typically made of a ultra-low expansion material such as Cer Vit or Zerodur which materials are made by Owens Illinois Corporation and Schott. Zerodur, for example, has an expansion coefficient of $\alpha = -8 \times 10^{-8}/°C$. Located at each apex of the triangular-shaped structure are mirrors 12, 14 and 16 which provide by reflection a path through the cavity, which cavity includes gas capillary tubes 18, 20 and 22. Mirror 16 is of a special type which incorporates piezoelectric actuators which flex the mirror material and thereby allows changes to the total overall path length of the ring laser gyroscope. The selected gas contained in capillary tubes 18, 20 and 22 is introduced into the cavity by means of anode 24 which communicates with capillary tube 20 and is sealed at the time of manufacturing by a cold weld 26. A second anode 28 similar to that of 24 is located such that it is in communication with capillary tube 22. However, anode 28 does not include a fill port. A cathode 30 which communicates with capillary tube 18 is used to complete the electrical circuit which creates the glow discharge. When the appropriate voltage is applied between the cathode 30 and the two anodes 24 and 28 to generate a glow discharge, a stray capacitance represented by capacitors 32 and 34 and illustrated in dashed lines exists because of the very high dielectric index of the ceramic or glass material. Typically, this dielectric index may range between $\epsilon = 9$ and 10. As the power is applied to the cathode 30 and anodes 24 and 28 it will be appreciated that the glow discharge will occur in the capillary cavities 18, 20 and 22. However, it will also be appreciated that glow discharge also exist in the lead-in communication capillaries 36, 38 and 40 which run between the anodes and cathodes to the cavity path. The glow discharge in the leadin capillaries 36, 38 and 40 to the anodes and cathode does not contribute to the gain in the laser and results in a detrimental power loss. In addition, the gas pressure of this prior art gas cavity ring laser gyroscope was typically on the order of two Torr. At such a low fill pressure, cathode 30 tends to experience sputtering and the resulting gas-cleanup reduces the life length of the ring laser gyroscope.

Referring now to FIG. 2, there is shown a gas filled cavity ring laser gyroscope incorporating the features of this invention. To aid in understanding this invention, it will be appreciated, that those portions of the ring laser gyroscope similar to the prior art ring laser gyroscope are identified by the same reference numbers. Thus, according to this invention there is shown the ring laser gyroscope struction 10 made out of a low expansion material such as Zerodur. A cavity including capillary tubes 18, 20, and 22 is enclosed by three mirrors 12, 14 and 16 as was the case with the prior art ring laser gyroscope. However, according to this invention anodes 42 and 44 are substantially smaller than the prior art anodes 24 and 28.

As is illustrated in FIG. 2 and more clearly by anode 42 in FIG. 3, a preferred embodiment of the unique anodes of this invention comprised a generally thumbtack-shaped structure having a head portion 48, which serves to seal the interior of the gas filled lasing cavity 20 from the surrounding atmosphere, a stem portion 50 and a spherical end portion 52. Although most materials typically used as anodes such as Invar, Columbium, etc., will be suitable as a material from which these new anodes may be manufactured, a particularly suitable material for the anode disclosed in FIG. 3 is a nonmagnetic titanium alloy 6Al-4V or type 300 stainless steel.

It has been found that the glow discharge which is present in the capillary tubes 18, 20 and 22 may be prevented from occuring above the bottom portion 54 of sphere 52 if the diameter of the spherical end is ¾ (or larger) of the lead-in hole 36. A typical installation comprises a 0.125 inch diameter hole and an anode having a sphere with a 0.093 inch diameter attached to an overall stem length of about 0.5 inch. In such an installation it has been found that sputtering of the anode stem 50 is prevented since the glow discharge does not reach the stem which is between the sphere 52 and the head portion 48 of the anode. It has further been found that a stem portion 50 which has a relatively small diameter with respect to the diameter of the sphere further minimizes stray capacitance and that the stem diameter (whether large or small) is not critical with respect to discharge current stability. Furthermore, calculations to determine the minimum diameter of a stem suitable for use to avoid damage due to mechanical resonant frequencies indicate that very small stem diameters 50 can be used. It has been found that the reduced stray capacitance makes it possible to utilize a fill pressure that is larger than in prior art ring laser gyroscopes without causing any plasma oscillations.

Figure 4:
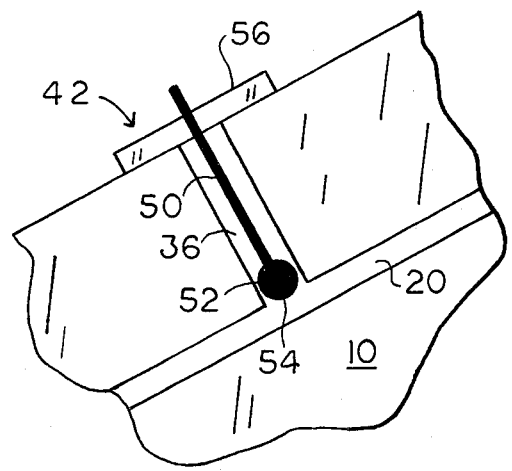

Referring to FIG. 4 there is shown another embodiment of the present invention. This embodiment is similar to that discussed in FIG. 3 above except that it does not include a head portion 48. Instead a sapphire plate 56 which is vacuum brazed to stem portion 50 by using eutectic silver-copper alloy and titanium powder to promote wetting is used to seal the interior of the cavity with respect to the atmosphere. Additionally, it has been found that Columbium and also Kovar are particularly suitable for the sphere portion 52 and stem 50 of the anode of this embodiment. Because of the dielectric nature of the sapphire plate 56, it has been found the stray capacitance between the anode head end 58 and the glow discharge in the capillary tubes 18, 20 and 24 has been substantially eliminated. In addition, the hard polished sapphire surface needs no rework or polishing after vacuum brazing.

Figure 5:
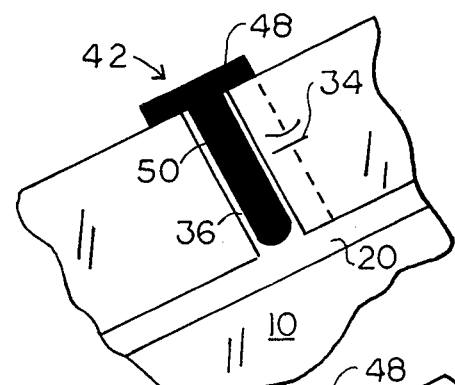

FIG. 5 illustrates still another embodiment which reduces the stray capacitance and increases the current stability. According to this Figure, the anode is similar to that shown in FIG. 3 except that the stem does not include a spherical portion 52. Although this embodiment is highly successful in reducing the stray capacitance and increasing the current stability, it has been found that under certain conditions, the glow discharge travels up the connecting path 36 and is distributed along the length of stem portion 50. Analysis of anodes of this type subjected to glow discharge indicates that the stem portion of the anode is subjected to sputtering after a period of time. Under certain conditions such sputtering may be unacceptable. It has been found, however, that if the diameter of the stem is made ¾ (or larger) of the lead in hole 36, that the gas discharge is confined to the tip of the stem. It has also been found that "walking" of the discharge on the tip of the stem can be prevented by shaping the tip to a half sphere. Walking of the discharge causes a low frequency instability of the glow discharge.

Figure 6:
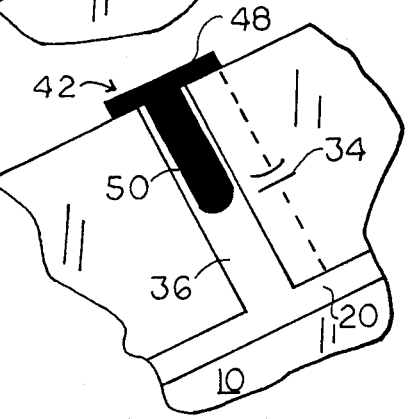

Finally, it has been found that the embodiment shown in FIG. 6 also increases the glow discharge current stability. This embodiment which is very similar to that discussed above with respect to FIG. 5 is shown as having a shorter length stem portion 50. A shorter length stem portion is necessary for proper operation if the material from which the anode is made is Invar or Kovar. This is because Invar and Kovar are magnetic and consequently the anode itself cannot be extended to close to the capillary cavity 18, 20 or 24.

Although the unique anodes of this invention for use with ring laser gyroscopes have been described with respect to specific apparatus for reducing stray capacitance and increasing glow discharge current stability, it is not intended that such specific references be considered limitations upon the scope of the invention except insofar as is set forth in the following claims.

What is claimed is:

1. An anode, for use in a laser with a body portion having an optical resonant cavity and having a lead-in communication passage connecting said optical resonant cavity with the surrounding atmosphere, comprising:
- a head portion having a head inner portion and a head outer portion;
- said head outer portion being arranged to engage said laser body portion for its support and for sealing off the surrounding atmosphere from the resonant cavity;
- said head inner portion being adapted to connect to a conductor to receive an electric potential;
- a stem portion disposed in said passage and fixedly connected to said head inner portion for electric contact therewith; and
- a discharge end portion disposed in said passage proximate to said optical cavity and fixedly connected to said stem portion for electric contact therewith; wherein
- said head outer portion is a dielectric disc, and said head inner portion extends through said disc.

2. The anode of claim 1 wherein said head outer portion is made from Sapphire and said head inner portion is made from a material selected from the group consisting of Columbium and Kovar.

3. The anode of claim 1 wherein said head outer portion and said head inner portion are joined by vacuum brazing.

4. The anode of claim 1 wherein said discharge end portion has a substantially spherical configuration.

5. An anode, for use in a laser with a body portion having an optical resonant cavity and having a lead-in communication passage connecting said optical resonant cavity with the surrounding atmosphere, comprising:
- a head portion having a head inner portion and a head outer portion;
- said head outer portion being arranged to engage said laser body portion for its support and for sealing off the surrounding atmosphere from the laser cavity;
- said head inner portion being adapted to connect to a conductor to receive an electric potential;
- a stem portion disposed in said passage and fixedly connected to said head inner portion for electric contact therewith; and
- a discharge end portion disposed in said passage proximate to said optical cavity and fixedly connected to said stem portion for electric contact therewith; wherein
- said passage has an inner surface, and said stem portion and said discharge end portion have respective outer surfaces being spaced from said passage inner surface, forming annular spaces, and said head portion is supported by said laser body portion, and said stem portion and said discharge end portion are supported by and cantilevered from said head portion.

6. The anode of claim 5 wherein said discharge end portion has a substantially spherical configuration, which spherical configuration has a diameter at least three-fourths as large as the diameter of said inner surface of said lead-in communication passage.

7. The anode of claim 5 wherein said stem portion has a diameter at least three-fourths as large as the diameter of said inner surface of said lead-in communication passage.

8. The anode of claim 7 wherein said discharge end portion has a semi-spherical shape with the same diameter as said stem portion.